Sept. 2, 1958 J. DE RAEMY 2,850,582

MAGNETIC HEAD

Filed March 20, 1956

INVENTOR

JACQUES de RAEMY

By [illegible] Atty.

United States Patent Office 2,850,582

Patented Sept. 2, 1958

2,850,582

MAGNETIC HEAD

Jacques de Raemy, Yverdon, Switzerland, assignor to Paillard S. A., Sainte-Croix, Switzerland, a corporation of Switzerland Application March 20, 1956, Serial No. 572,731

Claims priority, application Switzerland March 28, 1955

4 Claims. (Cl. 179—100.2)

It is a well-known fact that the magnetic circuit of a head intended for the magnetic recording and reproduction of sound should be made of a material having a high initial permeability. Such materials are generally very soft and their resistance to wear under the action of friction is small and consequently the pole-pieces of a magnetic head over which a magnetogram-carrier rubs are subjected to considerable wear since said carrier is formed by an abrading material. Obviously, said wear of the pole-pieces is highly objectionable since it has for its consequence a change in the characteristic features of the magnetic head.

It has been proposed to remove these drawbacks by various means and in particular certain prior known magnetic heads are provided with interchangeable pole-pieces. Other magnetic heads are designed so as to be adjustable and to cut out thereby the formation of a gap between the magnetogram strip or the like magnetogram carrier and the pole-pieces upon continued wear of the latter. These prior propositions show the drawback of making the constitution of the magnetic heads a highly complicated matter. Furthermore, the second solution of the problem referred to does not prevent any modification in the reluctance of the magnetic circuit forming the heads. The pole-pieces of certain prior known magnetic heads are coated with a layer of a material showing a high resistance to frictional wear. However, such coats show the drawback of forming an unnecessary gap between the pole-pieces and the magnetogram.

Now my invention has for its object a magnetic head, chiefly for sound reproducing and recording apparatus, including a magnetic support adapted to slide over said head, which head includes pole-pieces constituted by metal sheets the planes of the main surfaces of which are perpendicular to the plane of contact between the head and the magnetic support. Such an improved head removes the above mentioned drawbacks by reason of the fact that a least one of the main surfaces of at least one of the metal sheets is coated at least in the portion thereof adjacent to and extending up to the contacting area between the head and the magnetic carrier with a layer of material, the resistance of which to frictional wear is higher than that of the metal sheets so as to reduce the wear of the latter.

I have illustrated in the accompanying diagrammatic drawings two preferred embodiments of a magnetic head according to my invention. In said drawings.

Figures 1, 2:
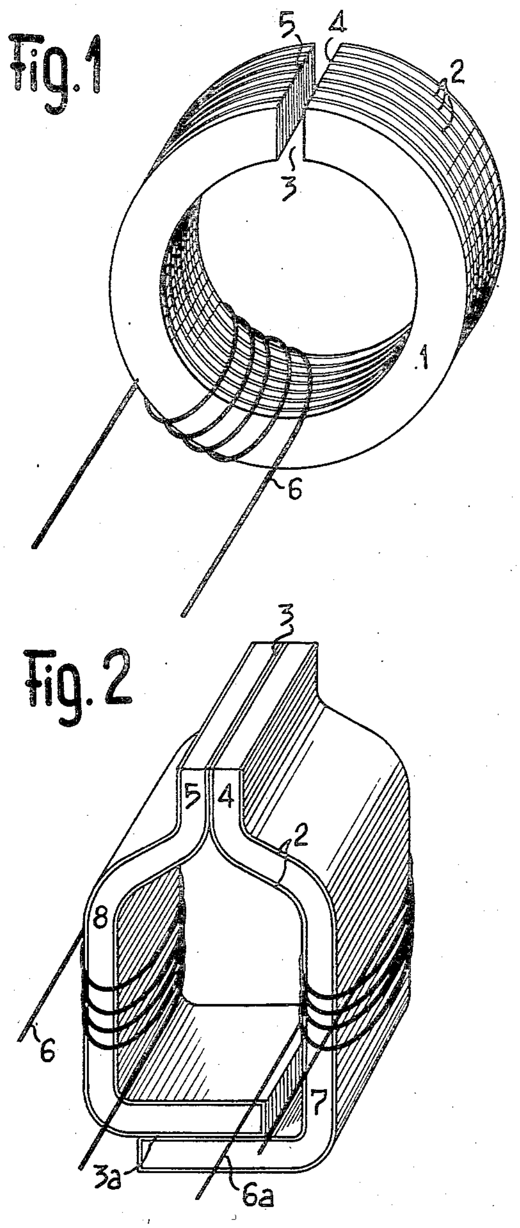
Fig. 1 is a perspective view of a magnetic head the magnetic circuit of which is constituted by thin juxtaposed metal sheets.
Fig. 2 is a perspective view of a magnetic head, the magnetic circuit of which includes two metal sheets of a specially designed shape.

In Fig. 1 is illustrated a magnetic head including a magnetic circuit constitued by thin juxtaposed metal sheets 1. Each of said metal sheets 1 is coated on each of its surfaces, for instance through an electrolytic procedure, with a very thin layer 2 of hard chromium, chromium showing a resistance to frictional wear which is higher than that of the actual metal sheets. Each of the metal sheets 1 is furthermore radially slotted in a manner such that said slots, registering with one another, form a gap 3 extending transversely with reference to the metal sheets 1, the sections of the juxtaposed sheets to either side of the gap 3 forming the pole-pieces 4 and 5 of the magnetic head. The head is also provided with an electric coil 6 surrounding the metal sheets 1. Said sheets are thus protected by chromium over their main surfaces, the planes of which are perpendicular to the plane of contact between the magnetic head and the magnetic strip or magnetogram carrier, said plane of contact being perpendicular to the gap 3 and tangent to the outer surface of the head.

When using the magnetic head described hereinabove, the magnetic strip or the like magnetogram carrier, which is not illustrated, is driven across the gap 3 so as to frictionally engage the pole-pieces 4 and 5. The chromium layers 2 show a resistance to wear which is much higher than that of the actual metal sheets and consequently the latter wear much less rapidly than in the case where said sheets are not provided with such a protective coat.

The magnetic circuit of the head illustrated in Fig. 2 is constituted by two metal sheets 7 and 8 the shape of which has been specially designed, said metal sheets being coated on each of their surfaces with a layer 2 of hard chromium. As apparent from the drawing, the layers 2 on the joining surfaces of the two metal sheets form gaps 3 and **3*a* respectively at both ends of the sheet. The thickness of the layers 2 is consequently such that a mere contacting between the metal sheets 7 and 8 may lead to obtaining gaps of the desired size, which furthers the execution of the heads. Of course, the contacting between the metal sheets 7 and 8 may be allowed only when the layer 2 is made of a non magnetic material, which is precisely the case, at least to a certain extent, with chromium. The head is provided furthermore with two symmetrical electric coils 6 and 6*a***.

It will be readily ascertained that, in the magnetic head described hereinabove, the wear of the sheets 7 and 8 produced through the friction of the magnetogram against the pole-pieces 4 and 5 is substantially reduced as a consequence of the coating of the metal sheets with a layer of hard chromium.

Obviously, the metal sheets may be coated only on those portions which form the pole-pieces. In the case of a magnetic circuit constituted by a number of juxtaposed metal sheets as in the head illustrated in Fig. 1, said sheet may be coated only over one of their surfaces.

Furthermore, in the case on the second embodiment illustrated in Fig. 2, only one of the metal sheets 7 and 8 need be provided on its surface facing the gap with a layer 2 of non magnetic material the resistance of which to wear is higher than that of the metal sheets. In this case, the value of the gap is defined by the thickness of a single layer 2.

On the other hand, it is obvious that if the metal sheets 7 and 8 are not positioned in joining relationship, the layer 2 does not require being amagnetic. In this case, the gap would be constituted by the layer of air left between the metal sheets 7and 8.

Obviously, for the coating of the metal sheets, it is possible to resort to materials other than hard chromium, provided the resistance of said material to frictional wear is higher than that of the metal sheets. Furthermore, the coating material may be provided only over the sections of the metal sheets adjacent to and extending up to the contacting area between the magnetic head and the magnetogram carrier or the like magnetic strip.

I claim:

1. A magnetic head for sound recording and reproducing apparatus for operation with magnetic carriers adapted to slide over said head, comprising, in combination, a plurality of juxtaposed metallic sheets forming a core having oppositely positioned and gap-separated pole-pieces comprising the juxtaposed end contact surfaces of said metallic sheets, the two principal surfaces of each of said sheets being on planes perpendicular to the plane of contact between the pole-pieces and the magnetic carrier sliding thereover, and a coating of a material having a frictional wear resistance greater than the frictional wear resistance of the metal constituting said sheets, said coating covering at least one of said principal surfaces at least over an area thereof adjacent to and extending up to the said end contact surface constituting the contacting surface between the magnetic head and the magnetic carrier.

2. A magnetic head for sound recording and reproducing apparatus for operation with magnetic carriers adapted to slide over said head, comprising, in combination, a plurality of juxtaposed metallic sheets forming a core having oppositely positioned and gap-separated pole-pieces comprising the juxtaposed end contact surfaces of said metallic sheets, the two principal surfaces of each of said sheets being on planes perpendicular to the plane of contact between the pole-pieces and the magnetic carrier sliding thereover, and an electrolytically deposited coating of hard chromium covering at least one of said principal surfaces at least over an area thereof adjacent to and extending up to the said end contact surface constituting the contacting surface between the magnetic head and the magnetic carrier.

3. A magnetic head for sound recording and reproducing apparatus for operation with magnetic carriers adapted to slide over said head, comprising, in combination, a plurality of juxtaposed metallic sheets forming a core having oppositely positioned and gap-separated pole-pieces comprising the juxtaposed end contact surfaces of said metallic sheets, the two principal surfaces of each of said sheets being on planes perpendicular to the plane of contact between the pole-pieces and the magnetic carrier sliding thereover, and an electrolytically deposited coating of hard chromium covering both principal surfaces of each of said sheets at least over the area thereof adjacent to and extending up to the said end contact surface constituting the contacting surface between the magnetic head and the magnetic carrier.

4. A magnetic head for sound recording and reproducing apparatus for operation with magnetic carriers adapted to slide over said head, comprising, in combination, a plurality of juxtaposed and spaced metallic sheets forming a core having oppositely positioned and gap-separated pole-pieces comprising the juxtaposed end contact surfaces of said metallic sheets, the two principal surfaces of each of said sheets being on planes perpendicular to the plane of contact between the pole pieces and the magnetic carrier sliding thereover, and a coating of a non-magnetic material having a frictional wear resistance greater than the frictional wear resistance of the metal constituting said sheets, said coating covering at least one of said principal surfaces at least over an area thereof adjacent to and extending up to the said end contact surface constituting the contacting surface between the magneic head and the magnetic carrier, said coating filling the space between adjacent sheets.

References Cited in the file of this patent

UNITED STATES PATENTS

| | | |
|---|---|---|
| 2,361,753 | Eilenberger | Oct. 31, 1944 |
| 2,585,932 | Hare | Feb. 19, 1952 |
| 2,660,622 | Field | Nov. 24, 1953 |
| 2,711,945 | Kornei | June 28, 1955 |